Sept. 30, 1924.
C. G. VON POST
1,510,118
BEARING FOR OSCILLATORY MOTION
Filed July 2, 1921
2 Sheets-Sheet 1
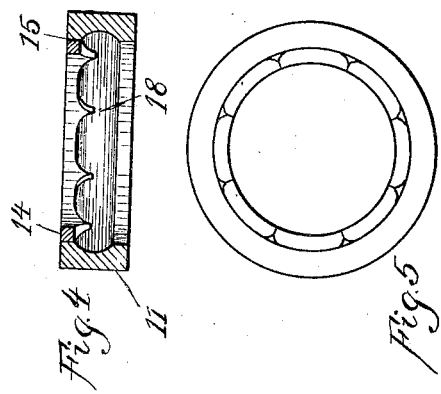
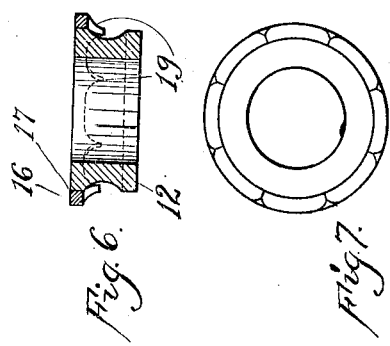
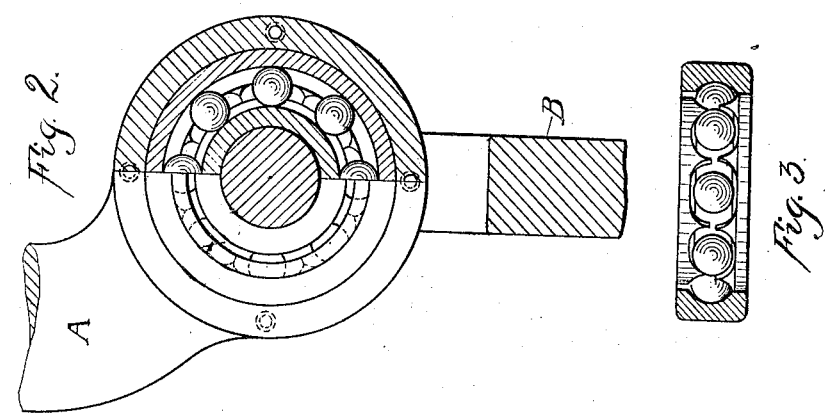
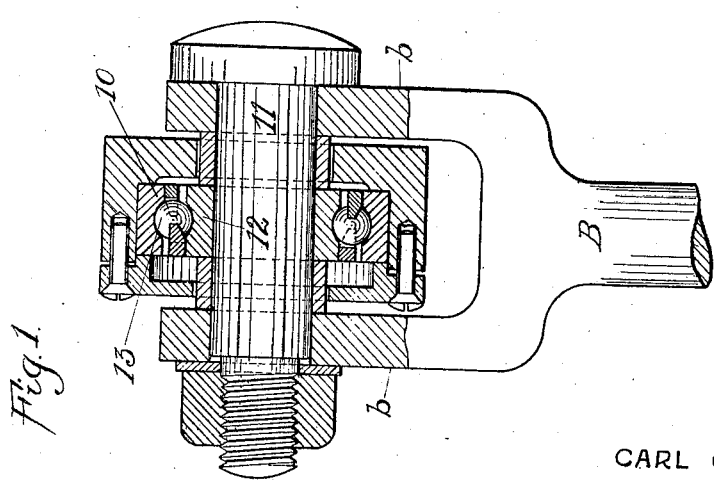
INVENTOR
CARL GUSTAF von POST
BY
ATTORNEYS.

Sept. 30, 1924.
C. G. VON POST
1,510,118
BEARING FOR OSCILLATORY MOTION
Filed July 2, 1921
2 Sheets-Sheet 2
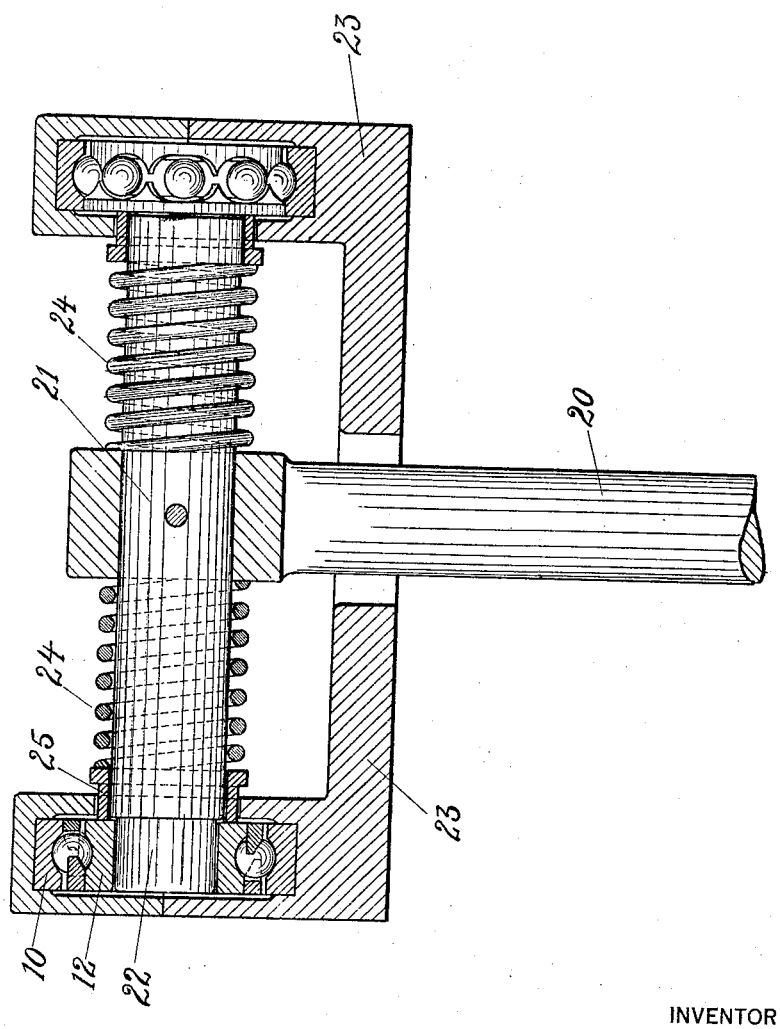
INVENTOR
CARL GUSTAF von POST.
BY
ATTORNEYS.

Patented Sept. 30, 1924.

1,510,118

UNITED STATES PATENT OFFICE.

CARL GUSTAF von POST, OF GOTTENBORG, SWEDEN; ANNA von POST ADMINISTRATRIX OF SAID CARL GUSTAF von POST, DECEASED, ASSIGNOR TO AKTIEBOLAGET ORIGINAL-ODHNER, OF GOTTENBORG, SWEDEN, A CORPORATION OF SWEDEN.

BEARING FOR OSCILLATORY MOTION.

Application filed July 2, 1921. Serial No. 482,251.

*To all whom it may concern:*

Be it known that I, CARL GUSTAF VON POST, a subject of the King of Sweden, residing at Gottenborg, Sweden, have invented certain new and useful Improvements in Bearings for Oscillatory Motion, of which the following is a specification.

This invention relates to anti-friction bearings having rolling elements for connecting a part oscillating relatively to its support, or for two parts which oscillate one relatively to the other. An object of the invention is to employ an annular ball or roller bearing for such an installation and, while separating or spacing apart the rolling elements, to provide separators which shall perform their function without hindering the free rolling of such elements. This is particularly desirable in precision mechanisms such as scales or weighing devices wherein a swinging part, which supports a considerable load, has to be mounted in such manner that friction is not present, and the part may obtain equilibrium without hindrance.

In the drawings accompanying this specification one practicable embodiment of my invention is shown which showing, it is to be understood, is based upon an illustrative example of the invention, in which drawings Figure 1 is a view of my improved bearing and the mounting therefor, shown in axial section;

Fig. 2 is a view partly in elevation and partly in cross section of the parts shown in Fig. 1;

Fig. 3 is a detail of the ball bearing, partly in top view and partly in horizontal section;

Figs. 4 and 5 are a horizontal section and an elevation, respectively, of the outer ring and the separator associated therewith;

Figs. 6 and 7 are similar views of the inner ring and the separator associated therewith, and Fig. 8 is an axial section showing a pendulum pivot supported by two of my bearings and illustrating a mode of applying elastic pressure to the balls.

The two parts A and B are intended to have a small amount of relative oscillation in the illustration, about twelve degrees in each direction from the normal line. The part A is assumed to be the support for the dependent member B. A suitable housing is formed in the member A for the outer race 10 of the anti-friction bearing which in the present illustration is a ball bearing. For convenience of description the bearing will be hereinafter referred to as a ball bearing. The member B shows two upstanding ears $b$, $b$, formed with suitable openings for receiving a pin or bolt 11, upon which is mounted the inner ring 12 of the ball bearing. The bearing illustrated is of the single row deep groove type, and is provided with a row of balls 13.

As the bearing is intended for use in mechanism wherein the parts connected thereby are intended for having a limited oscillatory motion, of course, the inner ring 12 has but a limited motion relatively to the outer ring 10, and the balls 13 roll back and forth through a path having rather small angular limits. The object of the invention above set forth is to permit an annular row of rolling elements to so move while being influenced to remain spaced apart at substantially uniform intervals, and this without frictional interference. In the present illustration there is shown a two piece separator, or two separators since they are moved independently, namely, a separator 14 having a tight fit with one of the lands 15 at the side of the race groove in the outer ring 10, and the other of which 16 has a tight fit with the land 17 at the opposite side of the race groove of the inner ring 12. These separators are shown provided with inwardly directed fingers, 18 and 19, respectively, which project into the path of movement of the balls, but are sufficiently short that in the oscillation of the parts the ends of the fingers 19 may pass by the ends of the fingers 18. The fingers of the respective separators are spaced a sufficient distance apart to permit the contemplated amount of oscillation of the relative parts so that at either end of the oscillatory movement the fingers will stop short of engagement with the ball. If the amount of oscillatory movement is to be quite short a larger number of balls may be used than if the amount of oscillatory movement is to be relatively longer. In selecting the size or diameter of balls for the bearing, regard will be had to the amount of load to be carried, the rapidity of the contemplated movement and its amplitude.

If a load is placed upon a scale equipped with my bearings and permitted to stand for some time during which the device is subjected to vibration, it is quite obvious that with loosely mounted bearings there will be a tendency for the balls to move downwardly on both sides of the bearing and engage the fingers of the separators in which position they will act as brakes impeding further movement of the scale when weight of load thereon is changed so that sluggish operation ensues, and inaccuracies of the scale reading may result. For the purpose of overcoming this tendency of the balls to move incident to vibration I subject the balls to elastic pressure since it is well known that whereas two bodies held together by friction will have a tendency to relative movement when under the influence of vibration, if, however, there is added to the frictional contact a spring or elastic pressure urging one toward the other, the vibration is important to effect any appreciable relative movement. In Figure 8 I have illustrated a means of applying such spring or elastic pressure on the balls for holding them in position against the influences of vibration as well as a means of supporting the pivot of a pendulum upon two of my improved bearings. The oscillatory supported member 20 is shown fast with a short shaft or pivot 21 upon the end 22 of which there is shown mounted the inner race ring of a ball bearing similar to that described above, the outer ring 10 being mounted in a suitable housing 23 the housing being of such internal dimensions that the outer ring is held from axial movement, but the inner ring is free to move. The inner ring is of sufficiently free fit upon the shaft or pivot that it may respond within the limits permitted by the closeness of the fit in the race grooves to the pressure of the compression spring 24 which surrounds the pivot shaft 21, and presses against the supported member 20, and forces the thimble 25 against the side of the inner race 12.

The result of the spring action upon the bearing is to place the balls under certain initial load to be regulated by the tension of the spring, the result of this initial tension makes the bearing more sensitive to respond instantly to its work, and also it holds the balls in their proper positions relatively to the fingers of the separators, and particularly when subjected to vibration. By employing two ball bearings, each spring pressed, and upon opposite sides of the supported member not only is the carrying capacity of such member increased, but its sensitiveness for certain classes of work is augmented.

Changes may be made in the details of construction, as occasion demands, within the scope of the claims, without departing from the spirit of my invention.

I claim as my invention:

1. In an anti-friction bearing, the combination with an inner and an outer ring and a series of rolling elements between the said rings, of separators for the said rolling elements, fast with the respective rings.

2. In an anti-friction bearing, the combination with an inner and an outer ring, and a series of rolling elements between the said rings, of means for spacing the rolling elements fast with the respective rings and permitting a limited amount of free rolling movement to each.

3. A bearing, adapted to be mounted between relatively oscillatory parts, comprising inner and outer bearing rings, a row of balls between such rings, and separators fast with the respective rings each separator having a finger located in the spaces between the balls of the row.

4. In a ball bearing, the combination with inner and outer rings respectively provided with race grooves and lands at the sides of said grooves, a row of balls located in the said grooves, a separator comprising a body portion fast with the land at one side of the race groove of the outer ring and having fingers projecting inwardly between the balls of the row, and a separator having a body portion fast with the land at the other side of the race groove of the inner ring and having fingers projecting inwardly between the balls of the row, said fingers of each separator being spaced apart a distance greater than the diameter of the balls and a distance to permit a predetermined amount of relative oscillatory movement of the rings and to permit the to-and-fro travel of the balls whilst free of engagement with the said fingers.

5. An anti-friction bearing for parts having relative oscillatory movement comprising annular members spaced apart, rolling elements interposed between such members and means fastened to said annular members and located in the path of the rolling elements so as to engage same only after a predetermined movement of the elements.

6. In an anti-friction bearing, the combination with an inner and an outer ring, and a series of rolling elements between the said rings, of means for spacing the rolling elements and permitting a limited amount of free rolling movement to each, and elastic means for preventing slip of said rolling elements upon the rings.

7. A bearing adapted to be mounted between relatively oscillatory parts, comprising inner and outer bearing rings, a row of balls between such rings, separators fast with the respective rings each having a finger located in spaces between the balls of the row, and elastic means for placing initial load upon the balls for maintaining them in their proper positions relatively to the said fingers.

In testimony whereof I affix my signature.

CARL GUSTAF von POST.